(12) United States Patent
Sfar

(10) Patent No.: US 9,332,468 B2
(45) Date of Patent: May 3, 2016

(54) HANDLING OF DOWNLINK IP PACKET TRANSMISSION SWITCHING ON DUAL SIM UE

(75) Inventor: Safouane Sfar, Nuremberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 44 days.

(21) Appl. No.: 14/007,601

(22) PCT Filed: Apr. 12, 2012

(86) PCT No.: PCT/EP2012/001581
§ 371 (c)(1),
(2), (4) Date: Oct. 23, 2013

(87) PCT Pub. No.: WO2012/139755
PCT Pub. Date: Oct. 18, 2012

(65) Prior Publication Data
US 2014/0044099 A1   Feb. 13, 2014

Related U.S. Application Data

(60) Provisional application No. 61/481,867, filed on May 3, 2011.

(30) Foreign Application Priority Data

Apr. 13, 2011   (EP) ..................................... 11368012

(51) Int. Cl.
*H04W 36/14* (2009.01)
*H04W 60/00* (2009.01)
*H04W 36/02* (2009.01)

(52) U.S. Cl.
CPC ............ *H04W 36/14* (2013.01); *H04W 60/005* (2013.01); *H04W 36/023* (2013.01)

(58) Field of Classification Search
None
See application file for complete search history.

(56) References Cited

U.S. PATENT DOCUMENTS

| 7,600,040 | B1 | 10/2009 | Henry et al. | |
|---|---|---|---|---|
| 2003/0108007 | A1* | 6/2003 | Holcman et al. | 370/331 |
| 2003/0109256 | A1* | 6/2003 | Holcman | 455/436 |
| 2004/0005893 | A1 | 1/2004 | Isobe et al. | |
| 2008/0130564 | A1* | 6/2008 | Gallagher et al. | 370/329 |
| 2009/0131054 | A1 | 5/2009 | Zhang et al. | |

(Continued)

FOREIGN PATENT DOCUMENTS

| EP | 1841267 A2 | 10/2007 |
|---|---|---|
| WO | 2005055502 A2 | 6/2005 |

OTHER PUBLICATIONS

Ahmed Z et al.: "A navigation device with MAC supporting multiple physical networks for extended coverage and operations," IEEE Transactions on Consumer Electronics, IEEE Service Center, New York, NY, US, vol. 54, No. 3, Aug. 1, 2008, pp. 1103-1109.

(Continued)

*Primary Examiner* — Benjamin H Elliott, IV
(74) *Attorney, Agent, or Firm* — Howison & Arnott LLP

(57) ABSTRACT

An apparatus and process is provided for handling downlink transmissions to a user equipment (UE) from a service provider wherein the UE is adapted to be associated with two subscriber identity modules (SIMs). The two SIMs are associated with a first communication network and a second communication network such that the UE can request a switch of downlink data via the first communication network to the second communication network.

14 Claims, 2 Drawing Sheets

(56) References Cited

U.S. PATENT DOCUMENTS

| | | | |
|---|---|---|---|
| 2009/0312020 A1* | 12/2009 | Lee | 455/435.2 |
| 2010/0027534 A1 | 2/2010 | Wu et al. | |
| 2010/0035613 A1* | 2/2010 | Schroter | 455/435.1 |
| 2010/0136962 A1* | 6/2010 | Tang | H04W 36/14 455/422.1 |
| 2012/0020325 A1* | 1/2012 | Swamy | H04W 36/14 370/331 |
| 2012/0063414 A1* | 3/2012 | Ramachandran | 370/331 |
| 2012/0178500 A1* | 7/2012 | Hwang | H04W 8/183 455/558 |
| 2012/0225651 A1* | 9/2012 | Rysgaard | 455/435.1 |

OTHER PUBLICATIONS

Hyun-Ho Choi et al.: "A seamless handoff scheme for UMTS-WLAN interworking," Global Telecommunications Conference, 2004. Globecom '04. IEEE Dallas, TX, USA, Nov. 29-Dec. 3, 2004, vol. 3, Nov. 29, 2004, pp. 1559-1564.

* cited by examiner

HANDLING OF DOWNLINK IP PACKET TRANSMISSION SWITCHING ON DUAL SIM UE

CROSS-REFERENCE TO RELATED APPLICATIONS

This application is a U.S. National Phase application submitted under 35 U.S.C. §371 of Patent Cooperation Treaty application serial no. PCT/EP2012/001581, filed Apr. 12, 2012, and entitled HANDLING OF DOWNLINK IP PACKET TRANSMISSION SWITCHING ON DUAL USIM UE, which application claims priority to European patent application serial no. 11368012.8, filed Apr. 13, 2011, and entitled HANDLING OF DOWNLINK IP PACKET TRANSMISSION SWITCHING ON DUAL USIM UE, and U.S. Provisional Application No. 61/481,867, filed May 3, 2011, entitled HANDLING OF DOWNLINK IP PACKET TRANSMISSION SWITCHING ON DUAL USIM UE.

Patent Cooperation Treaty application serial no. PCT/EP2012/001581, published as WO 2012/139755, and European patent application serial no. 11368012.8, are incorporated herein by reference.

TECHNICAL FIELD

The invention relates to the field of wireless communication and more particularly to a process for handling downlink transmission to a User Equipment (UE) from a Service Provider. The UE is adapted to be associated with at least two Subscriber Identities (e.g., at least two Subscriber Identity Modules (SIMs)) respectively associated with a first and a second communication Network.

BACKGROUND

The advent of mobile telephones and the development of wireless communications have opened new possibilities and new perspectives for the customers who are given higher communication speed, new services and a wide number of wireless communications networks becoming available on a given territory, e.g., Global System for Mobile communications (GSM), General Packet Radio Service (GPRS), High Speed Downlink Packet Access (HSDPA) and Long Term Evolution (LTE) networks.

In order to take advantage of such wide possibilities of wireless communication, more recent mobile phones are now equipped with two Subscriber Identity Modules (SIMs), corresponding to two distinctive telephone numbers offering communications with two distinct communication networks (e.g., Public Land Mobile Network (PLMN).

With such a dual SIM arrangement, the mobile equipment, be it a laptop, a conventional phone or a more sophisticated smartphone, receives the capacity to select one particular wireless communication network in accordance with the User's wish.

US 2010/0027534 entitled "Methods for handling Packet-Switched Data Transmissions by Mobile Station with Subscriber Identity Cards and Systems utilizing the same" discloses the use of two SIM cards and the switching balancing of the Uplink a data stream in the uplink method allowing the switching of an uplink IP packet between two Public Land Mobile Network.

Thanks to such known technique, a user equipment (UE) is given the possibility to switch an uplink data stream between two distinctive network operators and thus e.g., take advantage of the one offering the higher speed and Quality of Service (QoS).

This is already a first attractive use of two distinctive SIM cards, since a User Equipment, which transmits data to a base station belonging to a first network operator, is given the control to switch to a second network operator without loss of data in the uplink.

There is a desire to expand the use of two existing SIM cards to other situations, particularly the Downlink which raises additional problems since, contrary to the uplink, the party (User Equipment) taking the initiative of the switching process is NOT transmitting data but receives data from a base station.

Therefore, there is a need for methods and arrangements for handling downlink transmission during a network switch.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of embodiments of the invention to obviate at least some of the above disadvantages and to provide methods and arrangements for handling downlink transmission during a network switch.

Embodiments of the present invention provide a new process for handling the switching of a downlink (e.g., IP packet) transmission to a User Equipment adapted to be associated with at least two distinctive Subscriber Identities.

An embodiment of the invention provides a process offering the possibility to switch (e.g., upon request from the user via a user interface of the UE or the application running in the User Equipment) a Downlink (e.g., IP packet) transmission between two different communication networks (e.g., Public Land Mobile Network (PLMN)).

An embodiment of the invention provides a process which allows load balancing, in the downlink, of the (IP) packets being transmitted by two different networks and received by a User Equipment.

An embodiment of the invention provides a new User Equipment, such as a mobile phone, which is adapted to be associated with at least two subscriber identities and provides the possibility to switch a downlink (IP) packet transmission between two distinctive communication networks.

These and other embodiments of the invention may be achieved by a first aspect of the invention which is a process for handling downlink transmission to a User Equipment from a Service Provider (SP), the UE being adapted to be associated with at least two Subscriber Identities (SIM) respectively associated with a first and a second communication Network.

The process involves the steps of:

establishing a first connection between the UE and the first communication network; and requesting a second connection between the UE and the second communication network by issuing a specific command associated with a specific value or parameter representative of a request of switching between the first and second communication networks the downlink transmission;

issuing from the second communication network a specific request to the Service Provider for establishing a new connection between the second communication network and informing the SP that a switching of network is requested by the UE;

transmitting an acknowledgment from the SP to the second communication network confirming the establishment of the connection between the second communication network and the SP without starting data transfer through the second communication network;

transmitting from the second communication network to the User Equipment an acknowledgment related to said second communication network and the Service Provider;

issuing by the UE a request to be received by the SP and informing the latter of the sequence number of a first packet to be communicated through said second communication network instead of the first communication network;

performing data storage for the SP and the UE;

transmitting downlink data communication through the second communication network;

optionally transmitting NACK/ACK messages to the SP through the second communication network;

transmitting to the first communication network a request to release the connection issued by the Service Provider;

transmitting a connection release between the UE and the first communication network.

In some embodiments, the new connection between the UE and said second communication network is based on a procedure located within said Access Stratum, such as, for instance a RRC connection request associated with a specific parameter representative of a new cause for connection establishment (a so-called CAUSE FOR REDIRECTION).

In some embodiments, the new connection with the second communication network can be based on a procedure located within the Non Access Stratum, such as, for instance, a Service Request procedure associated with a specific parameter representative of a new cause for connection establishment (so-called CAUSE FOR REDIRECTION).

A second aspect of the invention is a User Equipment adapted to be associated with at least two Subscriber Identities (SIM) respectively associated with a first and a second communication Networks and for receiving downlink transmission from a Service Provider.

The User Equipment includes:

means for establishing a first connection with a first communication network; and means for requesting a second connection with a second communication network by issuing a specific command associated with a specific value or parameter representative of a request of switching between said first and second communication network the downlink transmission from said Service provider.

In some embodiments, the User Equipment further includes:

means for receiving from the second communication network to the User Equipment an acknowledgment from both the second communication network and the Service Provider;

means for issuing a request to the Service provider to data communication e.g., through said first communication network and the request being associated with a sequence number of a first packet to be communicated through the second communication network;

means for receiving downlink data communication through the second communication network;

means for transmitting NACK/ACK messages to the SP through the second communication network;

means for receiving a connection release from the first communication network and for continuing DL data transfer through the second communication network.

In some embodiments, the new connection between the UE and said second communication network is based on a procedure located within said Access Stratum, such as, for instance a RRC connection request associated with a specific parameter representative of a new cause for connection establishment (a so-called CAUSE FOR REDIRECTION).

In some embodiments, the new connection with the second communication network can be based on a procedure located within the Non Access Stratum, such as, for instance, a Service Request procedure associated with a specific parameter representative of a new cause for connection establishment (so-called CAUSE FOR REDIRECTION).

In a third aspect, the invention achieves a communication network including:

means for receiving from the UE a connection request associated with a value representative of a request for switching the DL transmission from said service provider through an earlier established connection with a first communication network;

means for issuing a specific request to the Service Provider for informing the latter that a switching of network has been requested by the UE;

means from receiving an acknowledgment from the Service Provider;

means for forwarding to the User Equipment the acknowledgment received from the Service Provider;

means for receiving and for forwarding to the Service provider a request being associated with a sequence number of a first packet to be communicated through the communication network;

means for transmitting downlink data communication to the UE;

means for receiving NACK/ACK messages from the User Equipment and for forwarding said NACK/ACK messages to the Service Provider.

In some embodiments, the new connection between the UE and said second communication network is based on a procedure located within said Access Stratum, such as, for instance a RRC connection request associated with a specific parameter representative of a new cause for connection establishment (a so-called CAUSE FOR REDIRECTION).

In some embodiments, the new connection with the second communication network can be based on a procedure located within the Non Access Stratum, such as, for instance, a Service Request procedure associated with a specific parameter representative of a new cause for connection establishment (so-called CAUSE FOR REDIRECTION).

A fourth aspect of the invention consists in a Service provider for providing downlink data transfer to a User Equipment UE being adapted to be associated with at least two Subscriber Identities (SIM) respectively associated with a first and a second communication Networks, the Service Provider including:

means for establishing a downlink data transfer with the User Equipment through the first communication network;

means for receiving from the second communication network a connection request associated with a value representative of a request from the User Equipment for switching the DL transmission between the first communication network and the second communication network;

means for transmitting an acknowledgment to the second communication network confirming the establishment of the without starting data transfer;

means for receiving a request from the User Equipment which indicates the sequence number of a first packet to be communicated through the second communication network;

means for performing data storage before the start of downlink transfer through the second communication network;

means for transmitting downlink data communication through the second communication network;

means for receiving NACK/ACK messages through the second communication network;

means for transmitting to the first communication network a request to release the connection.

A fifth aspect of the invention is a Mobile phone.

It should be noted that embodiments of the invention are equally applicable to dual SIM devices and multiple SIM devices.

Also, even though the subscriber identities typically reside in local memory areas of SIM cards which are physically inserted into corresponding SIM card readers in a mobile terminal; this must not be the case in all embodiments. In some embodiments, the subscriber identities may be provided to the mobile terminal in the form of a SIM software application executed in the terminal, and/or as a virtual SIM which is "stolen" or "borrowed" from another device and is rendered accessible to the terminal by way of a (wireless or other) interface.

Furthermore, it should be noted that embodiments of the invention are equally applicable to mobile terminals as to stationary devices associated with a cellular telecommunication network (e.g., routers, power consumption meters, home alarms, etc.). Such stationary devices are configured to be connected to a cellular communication network and are, when connected, seen as terminals by the network.

Embodiments of the invention are typically applicable to Dual SIM Dual Standby (DSDS) terminals, but may also find application in other types of devices.

BRIEF DESCRIPTION OF THE DRAWINGS

Other features of one or more embodiments of the invention will appear from the following description of embodiments of the invention, with reference being made to the accompanying drawings.

DETAILED DESCRIPTION

There will now be described one particular embodiment of a process which gives a User Equipment, such as a mobile equipment, a laptop, portable assistant, a smart phone or even a conventional mobile phone, the possibility to take advantage of different communication networks which are present in one given physical area.

It should be noticed that the procedures which are detailed below may be applied to a wide number of situations, and particular telecommunication standards, such as, but not limited to, GSM, GPRS, Wideband Code Division Multiple Access (W-CDMA), CDMA-2000, Long Term Evolution (LTE) standard, etc.

Furthermore, even though embodiments of the invention can be directly applied to a mobile phone, such as a smart phone, it should be clear that the procedures described below can be advantageously used for any User Equipment (UE) which can receive an IP packet transmission, including a computer, a Portable Document Assistant (PDA), a smart phone or more generally any mobile equipment fitted with wireless communication facilities.

Figure 1:
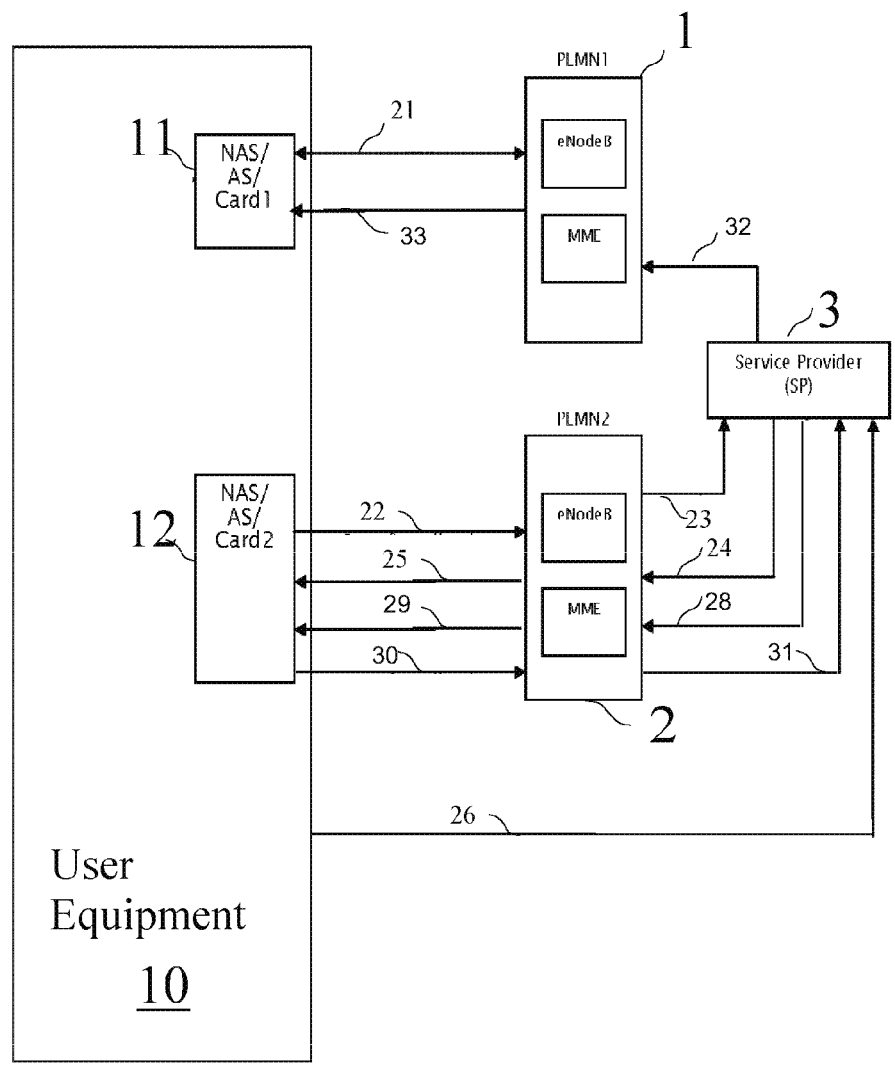
FIG. 1 is a general view showing one embodiment of a User Equipment allowing switching between two distinctive Public Land Mobile Networks.

With respect to FIG. 1, one User Equipment 10 is illustrated which is assumed to include at least two distinctive Subscriber Identity Modules (SIM) or cards 11 and 12, each one allowing communication with one dedicated PLMN 1, 2 (resp. PLMN1 and PLMN2 in FIG. 1) associated with a base station or eNodeB and Mobility Management Entity (MME) in case of LTE network. For the sake of clarity, "AS" refers to Access Stratum comprising the layers 2 and 3 of the communication model, while the Non Access Stratum (NAS) comprises the layers 4 and above.

It is further assumed that a Service provider 3 is arranged for the purpose of providing a flow of data to be received by User Equipment 10.

Clearly, in order to support wireless communications with the different PLMN, the UE 10 is fitted with appropriate (conventional or future) hardware circuits and/or software blocks required for the purpose of establishing two distinctive wireless communications, such as radio-frequency modules, base-band chips etc., which shall not be further elaborated since they are not part of the present invention.

Figure 2:
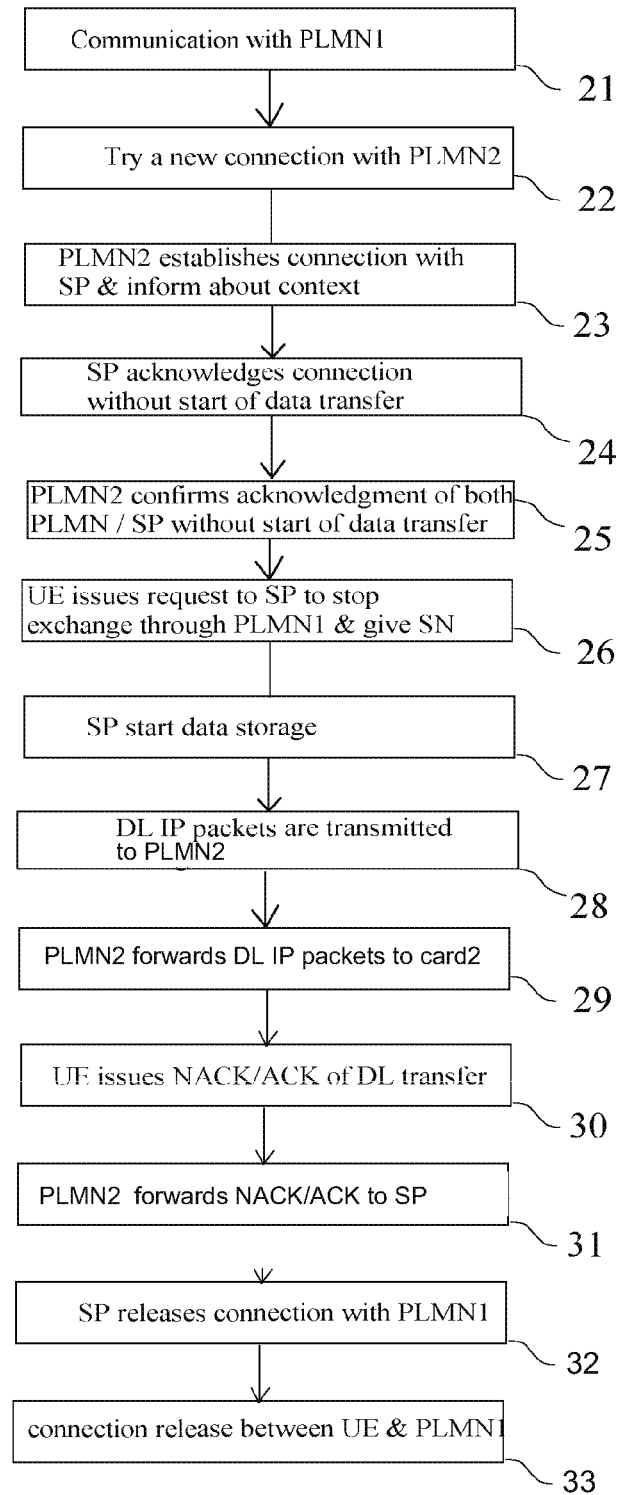
FIG. 2 illustrates the different steps according to one embodiment of the invention.

Considering now FIG. 2, it will be described one embodiment of a process which gives the UE the possibility to take the initiative of the switching between two PLMN even during downlink IP packet transmission.

The process starts with a step 21 wherein the User Equipment is assumed to be connected to a first Public Land Mobile Node 1, communicating through the first NAS/AS card 11. Such situation clearly covers the establishment of a phone call or a data communication. In one embodiment, Service Provider 3 may be a server providing video-on-demands on copyrighted materials which is transmitted through the downlink IP packet transmission handled by PLMN1. The communication between PLMN1 and card 11 is represented in FIG. 1 by an arrow bearing the reference 21 corresponding to the same step.

The next step 22 corresponds to the situation where the UE takes the initiative of requesting a switching of the downlink IP packets transmission from the PLMN1 to the PLMN2.

Such request can, in some embodiments, result from the user herself/himself who may decide that the quality of the downlink transmission is getting very poor and inputs a switch command via a user interface of the UE.

In some embodiments, such initiative may alternatively or additionally result from the NAS or AS layers existing in the mobile equipment.

Considering the Access Stratum (AS) and Non Access Stratum (NAS) layers, one may consider, for instance, the flow control procedures at the TCP/IP levels which might determine that the quality of the downlink transmission is getting poorer.

Alternatively, considering more particularly the Non Access Stratum (NAS) layer, one may consider the situation where one application running in the User Equipment detects the loss of a predefined quality of service (QoS).

Whatever the particular situation being considered, it should be observed, and this is one particular relevant aspect of the process described, that the switching is initiated from the User Equipment while the latter is receiving—even with low quality of service—a data flow from the PLMN1.

In step 22, the UE causes the second NAS/AS card 12 to try a new connection with the second Public Land Mobile Network (PLMN)2.

In one embodiment, a specific radio resource control (RRC) Connection Request (represented by arrow 22 in FIG. 1) is issued by the UE containing, an establishment cause. In addition to the already established causes, a new cause is now considered in the present embodiment so as to clearly inform the PLMN2 that the newly established connection will be used for performing a switching of data transfer in the Downlink between a first network (PLMN1) and the new network (PLMN2). To achieve this a new special identified parameter or value is introduced which identifies such particular context and such specific cause, designated as a so-called CAUSE FOR REDIRECTION In particular, it should be noticed that the particular and new parameter associated with the RRC Connection Request makes the latter clearly distinguished from the conventional RRC Connection Request since the PLMN2 is made aware of the context of the communication with the User Equipment.

While the RRC Connection Request shows to be an Access Stratum procedure, the skilled man may clearly consider other possible means, particularly procedures within the Non Access Stratum. In that regard, one may consider the use of a Service Request, associated with a specific code or parameter for advising the PLMN2—and subsequently the Service Provider 3—of the "new cause (REDIRECTION)" and thus the context of the communication with the UE.

Whatever the particular means being considered, (e.g., a RRC Connection Request within the AS layer or a Service Request within a NAS layer), the process then proceeds to a step 23 (represented by arrow 23 in FIG. 1) where the PLMN 2 issues a specific request for the attention of the Service Provider 3 for the purpose of establishing a new connection with the latter and informing it of the particular context (CAUSE FOR REDIRECTION).

Then, the process proceeds to a step 24 where the Service Provider 3 transmits an acknowledgement to the PLMN2, represented by arrow 24 in FIG. 1, confirming the establishment of the connection with the SP 3 without start of the data transfer.

It should be noticed that the communication between the PLMN 2 and the SP 3 which are involved in steps 23 and 24 can be based on any conventional communication means, be it wireless or not.

Then, in a step 25, the PLMN 2 uses an AS or NAS procedure for sending to the User Equipment 10 an acknowledgment of both the PLMN 2 and Service Provider 3, represented by arrow 25 in FIG. 1.

If the request issued by card 12 on step 22 was based on a AS procedure, and particularly a RRC connection request as above, the acknowledgment of step 25 may be, for instance, a CONNECTION SETUP or the like.

Clearly, the skilled man will adapt the process to any other procedure within the Access Stratum or even the Non Access Stratum. In the case of a Service Request, the procedure of step 25 could be based on a Service Access known in the NAS layer.

Then the process proceeds with a step 26 where the User Equipment 10 issues a request which is transmitted by appropriate means to the Service Provider (as represented by arrow bearing the same reference 26) in order to stop the exchange through the first PLMN 1. It particularly provides the sequence Number (SN) to the Service Provider which identifies the first packet which will have to be communicated through the PLMN2 after the completion of the switching process. It should be noticed that communication during step 26 may be achieved either through the session established with the new PLMN2 or with the still existing session with the PLMN1. In one particular embodiment, the request is forwarded to the Service Provider 3 by means of the wireless communication established with the second network operator PLMN2.

Upon receipt of such request, Service Provider 3 starts data storage in a step 27 (not shown in FIG. 1) so as to store the Downlink IP packages starting from the sequence number being received.

Correspondingly, the UE application performs data storage for the downlink.

Then, the process proceeds to a step 28 where the Service Provider performs the transmission of the DL IP packets through the newly established connection with the PLMN2, represented by arrow 28 in FIG. 1. Typically, the transmission through PLMN2 starts from the packet having the sequence number being received earlier.

In a step 29, the PLMN2 forwards to the NAS/AS card 12 the DL IP packets which it received from the SP, represented by arrow 29 in FIG. 1.

Then, in step 30, the packets are acknowledged or not by the UE which issues or not the NACK/ACK corresponding to the packets received which is transmitted to network PLMN2. This is shown by arrow 30 in FIG. 1.

Then, in a step 31, the NACK/ACK acknowledgment is forwarded from network PLMN2 to the service provider. This is shown by arrow 31 in FIG. 1.

It should be noticed that the data transfer as well as the NACK/ACK transmission goes through the PLMN2 for any packets having a sequence number higher than the SN identified in step 26.

Then, in a step 32, the Service Provider 3 transmits a request to release the connection with PLMN1. This is shown by arrow 32 in FIG. 1.

The process then completes with a step 33 with a connection release between UE and PLMN1. This is shown by arrow 33 in FIG. 1.

The communication then continues through the second PLMN until e.g., the user or the UE application decides to switch to a new PLMN, or the session ends.

Procedures were described for handling the switching of downlink IP packet transmission on dual SIM UE according to QoS parameters or user preferences. Reception of DL IP packet by the UE will switch from a PLMN to another.

The switching can be triggered by the application in UE side without user interaction (transparent for the user). In this case, if the application is not satisfied about the QoS offered by PLMN1 for the downlink IP packet transmission, it can trigger NAS/AS to make in a first step a QoS estimation in PLMN2 and in case of estimated QoS in PLMN2 is better than QoS in PLMN1, the switching of downlink IP packet transmission can be done without any loss of data.

On the other hand, sometimes a user prefers to switch the use of an application from an operator/network to another, and in this case a UE should support procedures to switch from a PLMN to another in a secure way and without loss of data.

In order to introduce procedures to handle the switching of downlink IP packet transmission on dual SIM UE, it is proposed a new mechanism for making easier communications between application layer, NAS/AS modules in UE side and the eNodeB/MME/Service Provider in the other side, in order to trigger the handover. Note that the example of eNodeB/MME is applicable to LTE networks. It is also noted that embodiments of the invention are equally applicable to other standards.

It should be noticed that, according to some embodiments, the user can indicate to the service provider the possibility to access the service through different PLMN. In some embodiments, the user can specify his preferred PLMN to the service provider.

Some embodiments of the invention are particularly applicable to 3GPP (for example RAN2, RAN3 and CT1).

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Embodiments of the present invention have been described with reference to flowchart illustrations of methods, apparatus (systems) and computer program products according to embodiments of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or another programmable data processing apparatus to cause a series of operational steps to be performed on the computer or other programmable apparatus to produce a computer implemented process such that the instructions which execute on the computer or the other programmable apparatus provide steps for implementing the functions specified in the flowchart block or blocks.

Accordingly, blocks of the flowchart illustrations support combinations of means for performing the specified functions, combinations of steps for performing the specified functions and program instruction means performing the specified functions. It will also be understood that each block of the flowchart illustrations, and combinations of blocks in the flowchart illustrations, can be implemented by special purpose hardware or computer systems which perform the specified functions or steps, or combinations of special purpose hardware and computer instructions.

The invention claimed is:

1. A method for handling a downlink transmission to a User Equipment (UE) from a service provider, the UE being adapted for association with at least two Subscriber Identity Modules (SIMs), the two SIMs being associated with a first communication network and a second communication network, the method comprising:
    establishing a first wireless connection between the UE and the first communication network;
    initiating a request, by the UE, to establish a second wireless connection between the UE and the second communication network by issuing a specific command associated with a specific value or parameter representative of a request for switching a downlink transmission from the service provider from said first communication network to the second communication network;
    issuing from the second communication network a specific request to the service provider for establishing a new connection between the second communication network and the service provider and for informing the service provider that a switching of network is requested by the UE;
    transmitting an acknowledgment from the service provider to the second communication network confirming the establishment of the new connection between the second communication network and the service provider without starting data transfer through the second communication network;
    transmitting from the second communication network to the UE an acknowledgment related to said second communication network and said service provider;
    issuing by said UE a request to be received by the service provider a sequence number informing the service provider of a first packet to be communicated through the second communication network instead of the first communication network;
    performing data storage for the service provider and the UE;
    transmitting a downlink data communication through the second communication network;
    transmitting to the first communication network a request to release the first wireless connection issued by the service provider;
    transmitting a connection release between the UE and the first communication network.

2. The method of claim 1, further comprising transmitting NACK/ACK messages to the service provider through the second communication network.

3. The method of claim 1, wherein the second wireless connection between the UE and the second communication network is based on a procedure located within access stratum.

4. The method of claim 3, wherein the access stratum procedure is based on a radio resource control (RRC) connection request associated with the specific value or parameter.

5. The method of claim 1, wherein the second wireless connection with the second communication network is based on a procedure located within non access stratum.

6. The method of claim 5, wherein the non access stratum procedure is based on a service request procedure associated with the specific value or parameter.

7. A User Equipment (UE) adapted to be associated with at least two Subscriber Identity Modules (SIMs) wherein the two SIMs are associated with a first communication network and a second communication network respectively, the UE being further adapted for receiving a downlink transmission from a service provider, the UE comprising:
    means for establishing a first wireless connection with the first communication network;
    means for initiating a request by the UE that initiates requesting a second wireless connection with a second communication network, the means for initiating the request issues a specific command associated with a specific value or parameter representative of a switching context requested by the UE to switch the downlink transmission from the service provider from the first communication network to the second communication network;
    means for receiving from the second communication network to the UE an acknowledgment from both the second communication network and the service provider;
    means for issuing a request to said service provider that informs the service provider of a sequence number of a first packet of the downlink transmission to be communicated through the second communication network;
    means for receiving the downlink transmission through the second communication network;

means for transmitting NACK/ACK messages to the service provider through the second communication network; and means for receiving a connection release from the first communication network and continuing the downlink transmission through the second communication network.

8. The UE of claim 7, wherein the second wireless connection between the UE and said second communication network is based on a procedure located within Access Stratum having a radio resource control (RRC) connection request associated with a specific parameter.

9. The UE according to claim 7, wherein the second wireless connection between the UE and the second communication network is based on a procedure located within non access stratum having a service request procedure associated with a specific parameter.

10. A communication network for handling a downlink transmission between a service provider and a User Equipment (UE), the UE being adapted to be associated with at least two Subscriber Identity Modules (SIMs) such that the two SIMs are associated with a first communication network and a second communication network respectively, the communication network comprising:

means for receiving, by the second communication network, from the UE an initial connection request associated with a value representative of a request for switching the downlink transmission from the service provider through an earlier established connection with the first communication network;

means for issuing, by the second communication network, a specific request to the service provider for informing the service provider that a switching from the first communication network to the second communication network has been requested by the UE;

means for receiving, by the second communication network, an acknowledgment from the service provider;

means for forwarding, by the second communication network, to the UE the acknowledgment received from the service provider;

means for receiving, by the second communication network, and for forwarding to the service provider a request providing a sequence number of a first packet to be communicated through the second communication network;

means for transmitting, by the second communication network, the downlink transmission to the UE;

means for receiving, by the second communication network, NACK/ACK messages from the UE and for forwarding the NACK/ACK messages to the service provider.

11. The communication network according to claim 10, wherein the second wireless connection between the UE and the second communication network is based on a procedure located within access stratum, e.g. based on a RRC connection request associated with a specific parameter.

12. The communication network according to claim 10, wherein the second wireless connection between the UE and the second communication network is based on a procedure located within non access stratum, e.g. based on a Service Request procedure associated with a specific parameter.

13. A service provider for providing a downlink data transfer to a User Equipment (UE), the UE being adapted to be associated with at least two Subscriber Identity Modules (SIMs) wherein the two SIMs are associated with a first communication network and a second communication network of the service provider respectively, the service provider comprising:

means for establishing a downlink data transfer with said UE through the first communication network;

means for receiving and interpreting from the second communication network a connection request associated with a value representative of a request that originated from and by the UE, the connection request being a specific type of request that requires switching the downlink data transfer between the first communication network and the second communication network;

means for transmitting an acknowledgment to the second communication network confirming establishment of the connection request between the UE and the second communication network without starting the down link data transfer;

means for receiving a request from the UE indicating a sequence number of a first packet to be communicated through the second communication network instead of the first communication network;

means for performing data storage before a start of the downlink data transfer through the second communication network;

means for transmitting the downlink data transfer through the second communication network;

means for receiving NACK/ACK messages through the second communication network; and means for transmitting to the first communication network a request to release the connection.

14. A computer program product comprising a non-transitory computer readable medium, having thereon a computer program comprising program instructions, the computer program being loadable into the UE and adapted to cause execution of the method according to claim 1 when the computer program is run by the UE.

* * * * *